3,467,648
PROCESS FOR THE PREPARATION OF
NUCLEOSIDE PHOSPHATE
Herbert Witzel and Hartmut Follmann, Marburg an der Lahn, Germany, assignors to Zellstofffabrik Waldhof AG, Mannheim-Waldhof, Germany, a corporation of Germany
No Drawing. Filed July 11, 1967, Ser. No. 652,404
Claims priority, application Germany, July 28, 1966, Z 12,357
Int. Cl. C07d 51/50
U.S. Cl. 260—211.5      4 Claims

ABSTRACT OF THE DISCLOSURE

This invention relates to a process for the preparation of a $$\text{nucleoside}_{(n)}\text{-phosphate}_{(n-1)}$$

where $n$ is an integer of 2 or 3 which comprises the steps of reacting a mononucleotide completely esterified in the sugar moiety selected from the group consisting of 2'-mononucleotides and 3'-mononucleotides with a compound selected from the group consisting of a nucleoside having unprotected OH groups and a $$\text{nucleoside}_{(m)}\text{-phosphate}_{(m-1)}$$

where $m = n-1$, having unprotected OH groups in an organic solvent media in the presence of a condensation agent, separating the reaction products, reacting the reaction products with an alkaline hydrolyzing agent and recovering said $$\text{nucleoside}_{(n)}\text{-phosphate}_{(n-1)}$$

selected from the group consisting of $$2' \to 5'\text{-nucleoside}_{(n)}\text{-phosphate}_{(n-1)}$$

and $$3' \to 5'\text{-nucleoside}_{(n)}\text{-phosphate}_{(n-1)}$$

These nucleoside$_{(n)}$phosphates$_{(n-1)}$ are known compounds and the 3'→5'-bonded dinucleoside phosphates and trinucleoside diphosphates are the smallest low molecular weight structural elements of nucleic acids, which contain all of their structural characteristics. Among others, they are useful in the study of chemical and physical properties of nucleic acids, particularly the various interactions existing between purine and pyrimidine bases in the nucleic acids. They are also useful as substrates to define the specificity and the effectiveness mechanism of nucleic acid-splitting enzymes (nucleases). Furthermore, they are useful as the smallest possible model molecules for messenger-RNS in the deciphering of the genetic code of proteinbiosynthesis, as well as starting agents for the enzymatic synthesis of oligo- and polynucleotides by polynucleotide-phosphorylases.

CLAIM OF PRIORITY

Under the provisions of 35 USC 119, the right of priority is hereby claimed based on the corresponding German patent application Z12,357 IVd/12p, filed July 28, 1966 on our behalf.

THE PRIOR ART

Compounds of this kind have already been obtained by various ways and means. For example, the partial hydrolysis of ribonucleic acid with metallic hydroxides [Dimroth et al., Liebigs Ann. Chem. 620, 109, (1959)]. By this process, a mixture of all of 16 possible dinucleoside phosphates as well as trinucleoside diphosphates was obtained, wherein 2'→5'-isomers, nucleosides, mono- and dinucleotides and larger nucleic acid fragments have been found. Only by a careful, repeatedly conducted chromatography through ion-exchanger columns was it possible to obtain a separation.

Moreover, an enzymatic synthesis is known, wherein under specific conditions, the reversible effect of the ribonucleases is utilized [Heppel et al., Biochem. J. 60, 8 (1955); Bernfield, J. Biol. Chem. 240, 4753 (1965); 241, 2014 (1966)]. Here, the 2',3'-cyclic nucleotides and nucleosides are used as starting compound. Due to the predominantly hydrolyzing effect of the enzyme employed, this method produces only small yields of condensation products and, consequently, it is for preparative purposes, of little prospect.

Recently, chemical syntheses by condensation of 3'- or 5'-mononucleotides or 2',3'-cyclonucleotides with nucleosides have become known [Cramer, Agnew. Chemi 78, 186 (1966)]. However, the chemical synthesis has the disadvantage, that, due to the numerous possibilities of formation of isomer mixtures prior to the condensation reaction, all of the hydroxy and amino groups of the starting substances have to be protected with the exception of those which participate in the condensation. Acetyl, benzoyl, benzylidenyl, tetrahydropyranyl or trityl radicals can serve as protective groups. After completed condensation reaction these radicals have again to be split off. Under these conditions, small amounts of products uniform in dinucleoside phosphate and trinucleoside diphosphate content have been obtained, especially by the process of H. G. Khorana et al. [Lohrmann and Khorana, J. Am. Chem. Soc. 86, 4188 (1964) and 88, 829 (1966); Lohrmann, Söll, Hayatsu, Ohtsuka and Khorana, J. Am. Chem. Soc. 88, 819 (1966)]. Although the condensation reaction itself produces satisfactory yield considerably losses have to be accepted during the introduction of the protective groups and their subsequent splitting off.

OBJECTS OF THE INVENTION

An object of the invention was to discover an improved process for the preparation of nucleoside phosphates, in particular, of dinucleoside phosphates and trinucleoside diphosphates.

Another object of the present invention is the development of a process for the preparation of a $$\text{nucleoside}_{(n)}\text{-phosphate}_{(n-1)}$$

where $n$ is an integer of 2 or 3 which comprises the steps of reacting a mononucleotide completely esterified in the sugar moiety selected from the group consisting of 2′-mononucleotides and 3′-mononucleotides with a compound selected from the group consisting of a nucleoside having unprotected OH groups and a $$\text{nucleoside}_{(m)}\text{-phosphate}_{(m-1)}$$

where $m=n-1$, having unprotected OH groups, in an organic solvent media in the presence of a condensation agent, separating the reaction products, reacting the reaction products with an alkaline hydrolyzing agent and recovering said $$\text{nucleoside}_{(n)}\text{-phosphate}_{(n-1)}$$

selected from the group consisting of $$2'\rightarrow 5'\text{-nucleoside}_{(n)}\text{-phosphate}_{(n-1)}$$

and $$3'\rightarrow 5'\text{-nucleoside}_{(n)}\text{-phosphate}_{(n-1)}$$

These and other objects of the invention will become more apparent as the description thereof proceeds.

DESCRIPTION OF THE INVENTION

It has now been found that the problem of preparation of the nucleoside phosphate could be solved in that those nucleosides suitable as condensation partners are utilized, whose OH groups are unprotected. Therefore, the invention consists in a process for the preparation of nucleoside$_{(n)}$-phosphates$_{(n-1)}$, where $n$ preferably has preferably has the value of 2 or 3, from 2′- and 3′-mononucleosides, preferably 3′-mononucleotides, which are completely esterified in the sugar radical, characterized in that the mononucleotides are condensed in the usual manner in the presence of condensing agents in solution in an organic solvent media with those nucleosides or nucleoside$_{(m)}$-phosphates$_{(m-1)}$ ($m=n-1$), whose OH groups are unprotected. The condensation products are separated, treated with an alkaline hydrolyzing agent dissolved in water and/or organic solvents, and the formed 3′→5′-, or 2′→5′-nucleoside$_{(n)}$-phosphates$_{(n-1)}$ are isolated in the usual manner.

As starting substances for the process of the invention, the following mononucleotides can be considered among others:

N$^6$,O$^{2'}$,O$^{5'}$-tribenzoyladenylic acid, N$^4$,O$^{2'}$,O$^{5'}$-triacetylcytidylic acid, N$^2$,O$^{2'}$,O$^{5'}$-triacetylguanylic acid, O$^{2'}$,O$^{5'}$-dibenzoyl-inosine phosphate, O$^{2'}$,O$^{5'}$-diacetyluridylic acid, in particular, but also all of the synthetically prepared nucleotides with a changed basic component.

Of course, with these nucleotides all of the nucleosides and 2′-deoxynucleosides, obtained in natural or syntheic manner, can be condensed, for example: adenosine, cytidine, guanosine, uridine, 3-N-methyluridine, isoadenosine, purine-riboside, N$_6$-dimethyl-adenosine, 1-benzyl-inosine, 6 - methylmercaptopurine - riboside, 2-pyridone-1-riboside, uric acid-N$^9$-riboside, etc.

Both condensation partners have to be present in dissolved form. According to their respective solubility, pyridine and/or dimethylformamide can be recommended as solvents. As condensation agents, preferably the dicyclohexylcarbodiimide (DCC) or the triisopropylbenzenesulfochloride (TPS) are employed, but other carbodiimides or acid chloride condensation agents are suitable also for this purpose. The reaction itself should be conducted at room temperature or at temperatures elevated to about 40° C. Still higher temperatures are possible; however, these will increase the secondary reactions and by-products.

After the condensation reaction has been completed, solvents and condensing agents are removed, for example, by precipitation of the condensation agent, extraction of the solution with petroleum ether and distillation of the solvent. Thereafter, the reaction product remaining is treated with an alkaline hydrolizing agent dissolved in water or organic solvents. Here the employment of an aqueous or methanolic ammonia solution was found of particular advantage. Subsequently, the separation of the products is carried out according to the known chromatographic processes such as paper-chromatography or anion-exchange-chromatography.

According to the process of this invention, it can be expected that the 3′- or even the 2′-mononucleotide employed can react with the nucleoside in its 2′-, 3′- as well as 5′-position. This is actually the case. In a not foreseeable manner, the 5′-bond is here preferred. However, in a startling way it was found that during the finishing process of the reaction mixture, following the condensation reaction, namely during the alkaline hydrolysis, only the 3′→5′- or the 2′→5′-nucleoside phosphate remained intact, whereas the two other isomers are split into the corresponding mononucleotide and nucleoside. As the excess unreacted nucleotides and nucleosides or those resulting from this splitting reaction can be recovered in pure form and can again be used, no loss occurs for these products. Therefore, if the yields obtained in the process of the invention are calculated on the mononucleotide employed, a yield of about 25% to 40% is obtained. Taking into account the recovery of the starting compounds, which is of particularly great advantage with regard to valuable starting substances, this yield is at least doubled.

The process of the invention does not only save time, work and the material consuming previous introduction of the protective groups into the nucleoside molecule and their successive splitting off later on, but it also furnishes in a very simple fashion the desired dinucleoside phosphates, trinucleoside diphosphates, etc., with large yields and of perfect purity. In relation to this it should be especially pointed out that the insignificant quantities of undesired by-products, resulting according to the claimed process, namely, the 3′→3′- and/or 3′→2′-diesters, can be eliminated during the finishing process without any additional working-up step and recovered for further processing.

The following examples are illustrative of the process of the invention. They are not, however, to be deemed limitative in any degree.

EXAMPLES 0.4 mmol of the nucleoside were dissolved in the just sufficient amount of anhydrous pyridine or pyridine/dimethylformamide (1:1). Then 0.2 mmol of the esterified 3′-mononucleotide, preferably the acetylated derivative, and 2 mmol of dicyclohexylcarbodiimide were added and the solution was allowed to stand, according to the amount of solvent used, from 8 to 14 days at room temperature or at a temperature of 30° C. Thereafter, water was added until turbidity occurred. Next, after resting for 12 hours, the solution was filtered off from the precipitated dicyclohexylurea. The residual excess dicyclohexylcarbodiimide was extracted with petroleum ether, and the pyridine-water-phase was concentrated to dryness by evaporation in vacuo. The residue was treated for 12 to 20 hours with ammonia in methanol (saturated at room temperature), then taken up, after evaporation in vacuo, in 100 ml. of water. The solution was filtered and placed on a column, which was filled with 50 ml. of an anion exchange resin, known under the tradename "Dowex 1–X2" (50 to 100 mesh) in the formiate form. The column was first washed with water. The through-flow contained excess and residual nucleosides. Thereafter the column was eluted with formic acid of increasing concentrations, and the eluate fractions containing the separated dinucleoside phosphate which were produced and the unreacted or newly formed nucleotides were taken. The separated materials in these eluate fractions were isolated by freeze drying or by evaporation in vacuo at room temperature (with an addition of methanol) and finally dried over P$_2$O$_5$.

The yields averaged 0.05 mmol (20 to 30 mg.)=25%, based on the acetyl-nucleotide used.

The following table shows the compounds prepared according to the process indicated:

TABLE I

| Example No. | 3'-nucleotide | Nucleoside | 3'→5'-dinucleoside-phosphate | Eluted at pH | $R_f$ [1] | pH 1 $\lambda_{max}$ m$\mu$ | Yield, percent |
|---|---|---|---|---|---|---|---|
| 1 | $N^4,O^{2'},O^{5'}$-triacetylcytidylic acid | Adenosine | CpA | 3.05 | 0.35 | 265 | 24 |
| 2 | do | Isoadenosine | CpIsoA | 3.48 | 0.29 | 275 | 20 |
| 3 | do | Purine-riboside | CpPu | 2.7 | 0.36 | 270 | 25 |
| 4 | do | $N^6$-dimethyladenosine | CpA(CH$_3$)$_2$ | 3.01 | 0.44 | 273 | 26 |
| 5 | do | Cytidine | CpC | 3.25 | 0.33 | 278 | 24 |
| 6 | do | Uridine | CpU | 2.95 | 0.31 | 268 | 27 |
| 7 | do | $N^3$-methyluridine | CpU(CH$_3$) | 2.95 | 0.47 | 269 | 26 |
| 8 | do | 2'-deoxyadenosine | CpdA | 3.25 | 0.42 | 265 | 28 |
| 9 | do | Thymidine | CpdT | 2.94 | 0.45 | 272 | 30 |
| 10 | $N^2,O^{2'},O^{5'}$-triacetyl-guanylic acid | Cytidine | GpC | 2.75 | 0.20 | 255, 268 | 25 |
| 11 | $O^{2'},O^{5'}$-diacetyluridylic acid | $N^6$-dimethyladenosine | UpA(CH$_3$)$_2$ | 2.61 | 0.50 | 264 | 30 |

[1] In Isopropanol:Water:2 N NH$_3$=7:2:1.

The preceding specific embodiments are illustrative of the practice of the invention. It is to be understood, however, that other expedients known to those skilled in the art may be employed without departing from the spirit of the invention or the scope of the appended claims.

We claim:
1. A process for the preparation of a nucleoside$_{(n)}$-phosphate$_{(n-1)}$ where $n$ is an integer of 2 or 3 which comprises the steps of reacting a mononucleotide completely esterified in the sugar moiety selected from the group consisting of 2'-mononucleotides and 3'-mononucleotides with a compound selected from the group consisting of a nucleoside having unprotected OH groups and a nucleoside$_{(m)}$-phosphate$_{(m-1)}$ where $m=n-1$, having unprotected OH groups, in an organic solvent media in the presence of a condensation agent, separating the reaction products with an alkaline hydrolyzing agent and recovering said nucleoside$_{(n)}$-phosphate$_{(n-1)}$ selected from the group consisting of 2'→5'-nucleoside$_{(n)}$-phosphate$_{(n-1)}$ and 3'→5'-nucleoside$_{(n)}$-phosphate$_{(n-1)}$ 2. The process of claim 1 wherein said organic solvent media is an anhydrous solvent in which all of the reactants are soluble selected from the group consisting of an anhydrous organic solvent and mixtures of anhydrous organic solvents.

3. The process of claim 1 wherein said condensation agent is selected from the group consisting of carbodiimide condensation agents and sulfonic acid chloride condensation agents.

4. The process of claim 1 wherein said alkaline hydrolyzing agents is ammonia in a solvent selected from the group consisting of water, methanol and mixtures thereof.

References Cited
UNITED STATES PATENTS 3,300,478    1/1967    Wechter    260—211.5
3,317,512    5/1967    Wechter    260—211.5

LEWIS GOTTS, Primary Examiner

J. R. BROWN, Assistant Examiner